May 2, 1967
J. E. SCHULTZ
3,316,779
ADJUSTABLE DRILL HEAD
Filed June 22, 1965
2 Sheets-Sheet 1
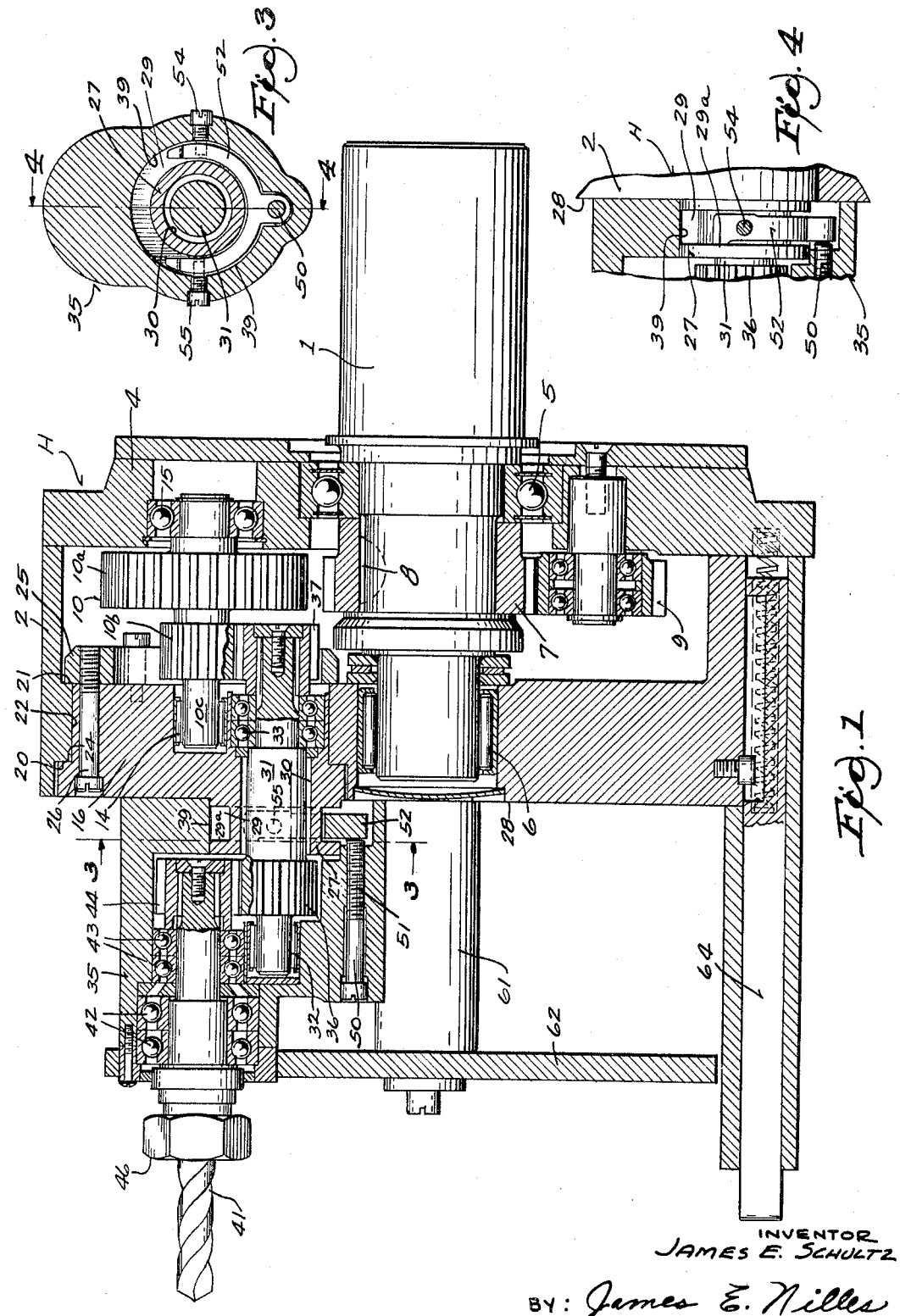
INVENTOR
JAMES E. SCHULTZ
BY: James E. Nilles
ATTORNEY May 2, 1967 J. E. SCHULTZ 3,316,779
ADJUSTABLE DRILL HEAD
Filed June 22, 1965 2 Sheets-Sheet 2
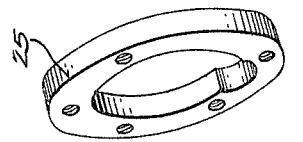
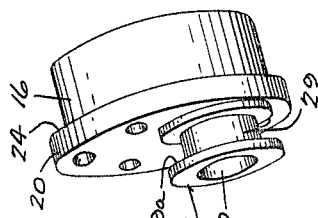
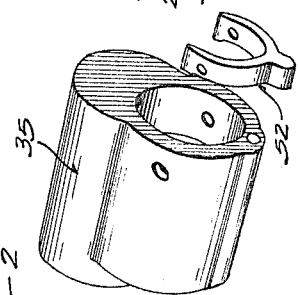
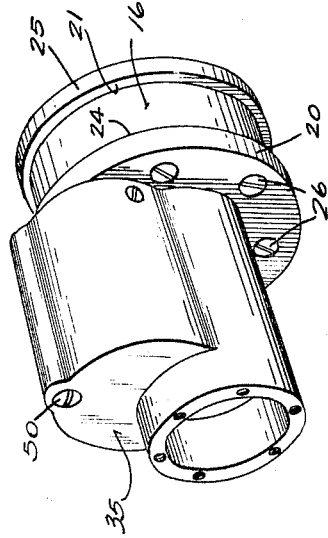
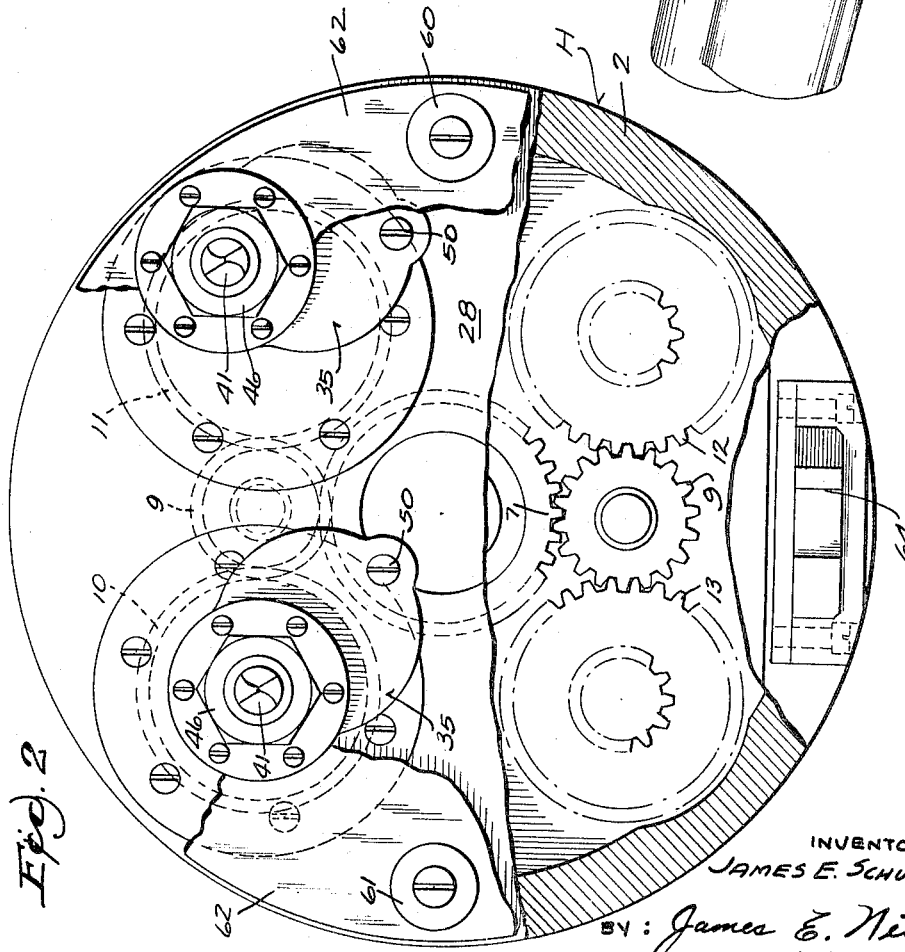
INVENTOR
JAMES E. SCHULTZ
BY: James E. Nilles
ATTORNEY United States Patent Office 3,316,779
Patented May 2, 1967

3,316,779
ADJUSTABLE DRILL HEAD
James E. Schultz, Elm Grove, Wis., assignor to H. O. Schultz, Inc., Milwaukee, Wis., a corporation of Wisconsin
Filed June 22, 1965, Ser. No. 465,960
6 Claims. (Cl. 77—24)

This invention relates to adjustable drill heads of the type in which the drill driving spindle is quickly and conveniently adjustable to any position within an extensive area and then locked in any one of a number of infinitely variable positions.

The present invention is in the nature of an improvement over the drill head shown in the United States Patent 2,441,722, issued May 18, 1948 end entitled, "Adjustable Drill Head," or in United States Patent 2,451,123, issued Oct. 12, 1948 and entitled, "Multiple Drill Template," both patents being issued to Henry O. Schultz.

The present invention provides an improved adjustable drill head in which the "overhang" distance between the end of the spindle and the idler housing has been substantially reduced from that of the prior art and which minimizes deflection of the drill and has greatly reduced breakage or wear of the various parts.

The invention also provides an improved, single locking means for quickly and simply locking and releasing the spindle housing.

These and other objects and advantages will appear hereinafter as this disclosure progresses, reference being had to the accompanying drawings in which:

FIGURE 1 is a longitudinal sectional view through a drill head embodying the present invention;

FIGURE 2 is an end view of the head shown in FIGURE 1, certain parts being shown as broken away;

FIGURE 3 is a transverse sectional view taken along line 3—3 in FIGURE 1 and showing the spindle lock;

FIGURE 4 is a sectional view taken along line 4—4 in FIGURE 3;

FIGURE 5 is a perspective view of the spindle housing and the idler housing of the head shown in FIGURE 1, but the housings being moved to different positions relative to one another;

FIGURE 6 is an exploded, perspective view of the parts of the FIGURE 3 device.

Referring in greater detail to the drawings, the drill head H includes a shank 1 by means of which the head is rotatably mounted in a turret (not shown) of a machine such as a turret lathe. The main housing 2 of the head has a back cover 4 which is journalled on the shank by anti-friction bearing assembly 5. The main housing is also journalled on the shank by the anti-friction needle bearing assembly 6.

A central gear 7 is fixed to the shank by key means 8 and is located within the generally hollow main housing 2.

The invention will be described as used in a drill head capable of having four drills working simultaneously, but other numbers of drills can be used on different sizes of drill heads.

A pair of idler gears 9 are rotatably mounted on the cover 4 and are also located within the main housing. These gears are in constant mesh with the central gear 7 and also with their respective pairs of compound gears 10 and 11, and 12 and 13.

The compound gears are similar to one another and only one will be described. They are all rotatably journalled on anti-friction bearing assemblies and are located within the hollow main housing.

The compound gear 10 has a larger gear 10a that is in constant mesh with the corresponding idler gear 9 and is driven thereby, and a smaller gear 10b is also formed integrally on the compound gear shaft 10c. The shaft 10c is suitably journalled on the anti-friction bearing assemblies 14 and 15. The assembly 14 is mounted within an idler housing 16 presently to be described.

Thus, there are four locations on the main housing at which an idler housing 16 and its spindle housing and drill can be located for receiving power from one of the compound gears 10.

The idler housing is rotatably adjustable between the shoulder 20 and the inner surface 21 of the bores 22 in the main housing by means of the annular, radial flange 24 formed on one end of the idler housing and the ring 25. Suitable cap bolts 26 extend through the idler housing and threadably engage in the ring 25 and hold the idler housing in assembled relationship in the main housing.

The generally cylindrical idler housing includes an integral post 27 which extends beyond the main outer surface 28 of the main housing and this post has a groove 29 formed externally around its intermediate portion. The post has a bore 30 extending through it and through the idler housing and a shaft 31 extends through this bore and is suitably journalled in anti-friction bearing assemblies 32 and 33, the latter of which is mounted in the idler housing. Assembly 32 is mounted in a spindle housing 35 to be described. Shaft 31 has a pair of gears 36 and 37 formed integrally therewith, gear 37 being in mesh with and driven by gear 10b.

The spindle housing 35 is mounted on surface 28 of the main housing and has a large bore 39 which mounts over the post 27. Housing 35 can be adjustably rotated about the post and fixed in any one of an infinitely variable positions as will later appear. A drill 41 is adapted to be chucked in the conventional manner in the spindle housing, journalled on anti-friction bearing 42, 43 and driven through the gear 44 from gear 36 meshing therewith.

Thus, the drill can be swung around through 360° with the spindle housing 35 and relative to the idler housing and quickly locked in any position, as will appear.

It will be noted that the spindle housing is short and the overhang distance from the end 46 of the chuck to the surface 28 of the idler housing is relatively short. This is accomplished by having the idler housing 16 located within the main housing leaving only the joint between the spindle and idler housings exposed.

The means for permitting rotational adjustment of the spindle housing and locking it in adjusted position is as follows. A long cap bolt 50 extends into housing 35 and is threadably engaged with it at its inner end, as at 51. The end of the bolt bears against one end of a yoke 52 while the other, bifurcated end of the yoke bears against the radial surface 29a of groove 29 of post 27. The yoke is pivotally mounted intermediate its ends in the spindle housing by means of the diametrically opposite screws 54 and 55 which extend through the housing and into opposite sides of the yoke. By screwing the bolt into the housing its inner end forces the yoke to pivot and the other end of the yoke bears tightly against the surface 29a of the post, thus pulling the spindle housing 35 down tightly on the idler housing and locking it in place. Loosening of bolt 50 slightly permits the spindle housing to rotate to any position.

With the above construction, the idler housing is located within said main housing and beneath the main outer surface 28 of the main housing except only for the post which protrudes outwardly beyond the main surface. The opening of the spindle housing receives the post and permits the spindle housing to be positioned flush with the main surface. This reduces overhang of the adjustable spindle housing to a minimum and permits 360° adjustment. The releasable locking means includes the threaded member or bolt 50 which extends through the spindle housing and its outer end is readily accessible to an Allen wrench, or the like, for easy adjustment. The yoke 52 forms a pivoted member which is carried by the spindle housing and can exert a considerable leverage or clamping, lock up force.

Template posts 60 and 61 (FIGURE 2) hold the locking template 62 and the detail structure and function of this plate is described and claimed in the above mentioned patents and need no further description here.

In operation the conventional spring loaded, sliding driver 64 carried by the main housing engages a complementary driving dog (not shown) carried by a rotating chuck (not shown) which holds the workpiece. This driver forms a synchronizing connection between the workpiece and drills and the drill head rotates with the workpiece. The shank is then driven to rotate the drills to thereby produce the desired holes in the workpiece.

Various modes of carrying out the invention are contemplated as being within the scope of the following claims particularly pointing out and distinctly claiming the subject matter which is regarded as the invention:

1. A rotatable multiple drill head having a shank and a main housing rotatably journalled on the shank, an idler housing rotatably mounted within said main housing and having means for permitting it to be rotated and locked in any desired position within said main housing, said main housing having a main outer surface and said idler housing being located within said main housing and beneath said surface except for a post which protrudes outwardly beyond said surface, a spindle housing having an opening which receives said protruding post and permits said spindle housing to be positioned flush with said main surface, said spindle housing being rotatable on said post for 360° and adapted to rotatably support a drill therein, a gear power train means extending from said shank through said housings and to said drill for rotating the latter, and releasable means for locking said spindle housing relative to said main surface of said main housing.

2. A drill head as defined in claim 1 further characterized in that said releasable means includes a member pivoted on said spindle housing, and a threaded member carried on said spindle housing for engaging said pivoted member and urging it tightly against said post to lock the spindle housing against the idler housing.

3. A drill head as defined in claim 2 further characterized in that said pivoted member is a yoke which surrounds and engages said post, and said threaded member is a bolt which extends through said spindle housing for adjustment.

4. A rotatable multiple drill head having a shank and a main housing journalled on the shank for rotating about the shank axis, an idler housing rotatably mounted about said axis and within said main housing and having means for locking said idler housing in any desired position within said main housing, said main housing having a main outer surface normal to said axis and said idler housing is located within said main housing, an eccentric post formed integrally with said idler housing and protruding outwardly beyond said surface, said post being parallel but eccentric to said axis, a spindle housing rotatably mounted on said protruding post and abutting against said main surface, said spindle housing being rotatable on said post for 360° and adapted to rotatably support a drill therein, a gear power train means extending from said shank through said housings and to said drill for rotating the latter, and releasable means for locking said spindle housing against said surface.

5. A drill head as defined in claim 4 further characterized in that said releasable means includes a member pivoted on said spindle housing, and a threaded member carried on said spindle housing for engaging said pivoted member and urging it tightly against said post to lock the spindle housing against the idler housing.

6. A drill head as defined in claim 5 further characterized in that said pivoted member is a yoke which surrounds and engages said post, and said threaded member is a bolt which extends through said spindle housing for adjustment.

No references cited.

FRANCIS S. HUSAR, *Primary Examiner.*